UNITED STATES PATENT OFFICE.

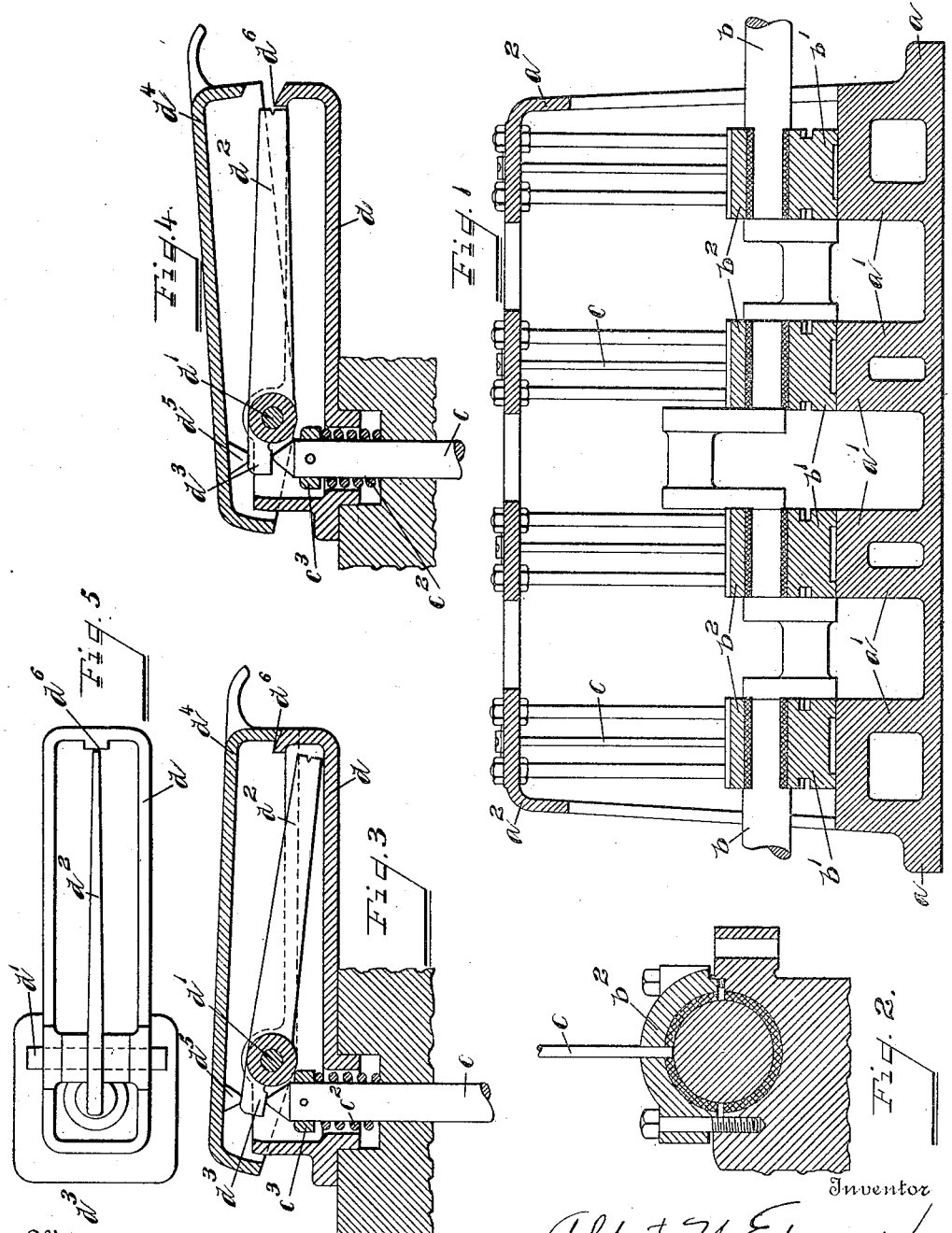

ALBERT Y. EDWARDS, OF SPRINGFIELD, OHIO, ASSIGNOR TO THE FOOS GAS ENGINE COMPANY, OF SPRINGFIELD, OHIO, A CORPORATION OF OHIO.

INDICATOR FOR SHAFT-BEARINGS.

1,133,462. Specification of Letters Patent. Patented Mar. 30, 1915.

Application filed September 15, 1910. Serial No. 582,281.

*To all whom it may concern:*

Be it known that I, ALBERT Y. EDWARDS, a citizen of the United States, residing at Springfield, in the county of Clark and State of Ohio, have invented certain new and useful Improvements in Indicators for Shaft-Bearings, of which the following is a specification.

This invention relates to devices for indicating the alinement of the several bearings of a shaft, particularly shafts for explosive engines. One of the main objections to vertical multiple cylinder explosive engines has been due to the frequent breakage of the crank shafts. After many attempts to overcome the difficulty, it was discovered that the principal cause of this breakage was due to the fact that the bearings of the shaft would wear unevenly, thus causing the shaft to be subjected to strains which caused crystallization; it being understood that these strains are particularly severe in high power explosive engines. For instance, if one of the bearings became worn to such an extent that it would be lower than the adjacent bearings, each explosion of the cylinder connected to that particular part of the shaft would bring such a strain thereon as to cause the same to spring. This difficulty was thought to be overcome by making the various bearings adjustable, but this was only a partial solution of the question because the operator had no means of determining whether or not the bearings were in perfect alinement except by certain more or less inaccurate measurements.

The object of this invention is to provide simple and effective means for indicating the relative positions of the several bearings of the shaft with respect to each other by indicating or detecting any non-alinement of or spring in the shaft during the rotation thereof, so that said bearings may be properly adjusted; these indicating devices being adapted to indicate to the operator the proper adjusted position of the respective bearings.

The invention consists in the construction and combinations of parts hereinafter described and set forth in the claim.

In the accompanying drawings—Figure 1 is a longitudinal sectional view taken through the bed of a gas engine and its several bearings showing a crank shaft in said bearings with my improved indicating device shown applied thereto. Fig. 2 is a vertical sectional view through the shaft and one of its bearings, also showing a part of the indicating devices. Fig. 3 is a longitudinal sectional view through the indicating devices, showing the same in their normal position. Fig. 4 is a similar sectional view of the same, showing the same, however, in indicating position. Fig. 5 is a top plan view of the same, with the top cap removed.

Like parts are indicated by similar characters of reference in the several views.

In said drawings, $a$ $a$ represent the bed or frame of an ordinary explosive engine, constructed in the usual way to support the cylinders and operating parts. The crank shaft $b$ is supported in a series of bearings located in the bearing blocks $b^1$, which blocks are supported upon the webs $a^1$ of the base, and any suitable means may be employed for adjusting these bearings, such as those described in Letters Patent No. 1,001,003, granted August 22nd, 1911, which shows and describes the bearing blocks located in curved seats upon the respective webs $a^1$, together with means for turning said blocks in said curved seats, the bearings proper being located eccentrically on the blocks. Each of the bearings preferably has a removable cap $b^2$, and extending loosely through a perforation in this cap, so as to be capable of resting directly against the shaft, is an upwardly extending rod, $c$, the upper end of the rod being extended loosely through a perforation in the upper part $a^2$ of the frame, the said rod being supported by a spring $c^2$ which is interposed between said frame and a collar $c^3$ secured to the upper end of the rod, the construction being such that in the normal position of the rod, its lower end will be slightly removed from contact with the shaft.

Supported on the top of the frame $a^2$ is a series of casings or frames, $d$, one for each rod $c$. Each of these frames $d$ is provided with a perforation through which the upper end of its rod $c$, together with the spring $c^2$, extend. Pivoted upon a cross-pin or shaft $d^1$ in each of said frames is an indicating lever $d^2$, the short arm $d^3$ of which stands adjacent the upper pointed end of the rod $c$, so that in the normal inoperative position of the indicating device the spring $c^2$ will hold the indicating lever in the position shown in Fig. 3. Also pivoted on the pin $d^1$ is a lever $d^4$ formed in the nature of a cap or cover which has a depending lug $d^5$ adjacent the short arm $d^3$ of the indicating lever.

The top $a^2$ of the frame is machined so that all parts of it will be in alinement with, or parallel to, the crank shaft and its bearings when they are in proper adjusted position. This top therefore provides what may be called a series of alined supports for the indicating devices, so that by adjusting the bearings in uniform relation with the top $a^2$ they may be readily brought into alinement with each other.

When it is desired to test the alinement of the bearings for the shaft, the operator lifts the lever $d^4$ while the engine is operating, to the position shown in Fig. 4, which, through the medium of the lug $d^5$, depresses the short arm $d^3$ of the index lever $d^2$ and also the rod $c$ against the tension of its spring, until the lower end of the rod rests upon the shaft. If the bearings are in their proper adjusted positions and the shaft is running true, the notch in the outer end on the arm of the index lever will register with the point $d^6$ of the arm $d$. Any variation of the index lever from this point would indicate that the bearings were not in proper alinement. Likewise, the operator may, by retaining hold of the lever $d^4$, detect any vibrations in the shaft caused by uneven adjustment of the bearings, so it will be understood that by the term "gage" as used in the claim, will mean any form of indicating device, whether visual or otherwise, which will indicate the movement of the shaft.

It will be seen by this construction that the relative position of the several bearings of the shaft may be tested at any time without the necessity of stopping the shaft. In fact, the proper position of the bearings can only be conclusively determined, when the engine is operating under the explosive pressures in the cylinders.

With the parts arranged as in Fig. 1, employing a gage associated with each of the four bearings and spaced apart as indicated at Fig. 1, it is apparent that in practice, any one can determine the amount of spring to the shaft at four different points along the shaft, and it will often happen that there will be sufficient spring in the shaft, due to the wear of the bearings or improper location of the bearings, that two or more of the gages will indicate some movement, but as a matter of fact, one gage may indicate more movement than any other gage and that will indicate that the bearing associated with the gage indicating the most movement is probably the one that needs attention and the operator can thereupon repair that bearing and put it in proper condition and then determine whether there is any movement or vibration indicated by any of the gages after this repair has been made, and if there is still movement indicated by an adjacent gage, the operator will know that one of the other bearings will have to be repaired. But it will often happen that the repairing of one of the bearings will result in none of the gages indicating any movement, so that the operator will know that all of the bearings are true and in proper condition.

Having thus described my invention, I claim:—

In an indicator for shaft bearings, a rod, one end of which is adjacent the shaft, a spring for supporting said rod normally away from said shaft, a pivoted indicating lever, the short arm of which rests on the other end of said rod, a casing for said lever into which said other end of said rod extends, and a pivoted cover for said casing, together with means whereby when said cover is raised, said rod will be forced yieldingly against said shaft and said indicating lever will be moved to indicating position.

In testimony whereof, I have hereunto set my hand this 9th day of September 1910.

ALBERT Y. EDWARDS.

Witnesses:
CHAS. I. WELCH,
ELSA K. SMITH.